(12) United States Patent
Hattori

(10) Patent No.: US 6,349,280 B1
(45) Date of Patent: *Feb. 19, 2002

(54) METHOD AND APPARATUS FOR SPEAKER RECOGNITION

(75) Inventor: Hiroaki Hattori, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/262,083

(22) Filed: Mar. 4, 1999

(30) Foreign Application Priority Data

Mar. 4, 1998 (JP) .......................................... 10-069515

(51) Int. Cl.$^7$ ............................................. G10L 17/00
(52) U.S. Cl. ...................................... 704/250; 704/238
(58) Field of Search ................................ 704/238, 246, 704/249, 250, 256, 252

(56) References Cited

U.S. PATENT DOCUMENTS

| 4,975,959 A | * | 12/1990 | Benbassat .................... 381/41 |
| 5,732,394 A | * | 3/1998 | Nakadai et al. ............. 704/255 |
| 5,848,388 A | * | 12/1998 | Power et al. ................ 704/239 |
| 5,893,058 A | * | 4/1999 | Kosaka ........................ 704/254 |
| 5,946,654 A | | 8/1999 | Newman et al. ............ 704/246 |
| 6,070,139 A | * | 5/2000 | Miyazawa et al. .......... 704/275 |

FOREIGN PATENT DOCUMENTS

| JP | 57-22120 | 5/1982 |
| JP | 63-157199 | 6/1988 |
| JP | 3-16038 | 3/1991 |
| JP | 3-45417 | 7/1991 |
| JP | 3-274596 | 12/1991 |
| JP | 4-5198 | 1/1992 |
| JP | 6-32003 | 4/1994 |
| JP | 6-32007 | 4/1994 |

OTHER PUBLICATIONS

L. Gillick et al., "Application of Large Vocabulary Continuous Speech Recognition . . . Using Telephone Speech", ICASSP, IEEE, pp. II–471–474 XP000427828 ISBN.
Y. Kao et al., "Free–Text Speaker Identification Over Long Distance . . . Phonetic Segmentation", ICASSP, IEEE, vol. Conf. 17, pp. 177–180 XP000356966.
J.O. Olsen, "A two–stage procedure for phone based speaker verification", Pattern Recognition Letters, NL, vol. 18, No. 9, pp. 889–897 XP004102230.
Institute of Electronics, Information, and Communication Engineers Research Report "Sounds", vol. 95. No. 431, SP95-107, 99–104.
Proceedings of the 10$^{th}$ Spring Conference of the Japanese Acoustics Society I 2–6–7 "Creating registration patterns through continuous speech segment recognition among speakers" pp. 67–68 (published Mar. 17, 1998).
Fujihara, et al., "A Scheme of Hybrid Phoneme Segmentation System Based n HMM Spectrogram Reading," The Journal of the Acoustical Society of Japan, pp. 85–86, Mar., 1991.
Furui, "Digital Speech Processing", Publishing Association, Tokai University (cover and publishing information).

* cited by examiner

Primary Examiner—William Korzuch
Assistant Examiner—Susan McFadden
(74) Attorney, Agent, or Firm—Foley & Lardner

(57) ABSTRACT

A method of recognizing a speaker of an input speech according to the distance between an input speech pattern, obtained by converting the input speech to a feature parameter series, and a reference pattern preliminarily registered as feature parameter series for each speaker is provided. Contents of the input and reference speech patterns is obtained by recognition. An identical section, in which the contents of the input and reference speech patterns are identical is determined. The distance between the input and reference speech patterns in the calculated identical content section is determined. The speaker of the input speech is recognized on the basis of the determined distance.

11 Claims, 5 Drawing Sheets

FIG. 4
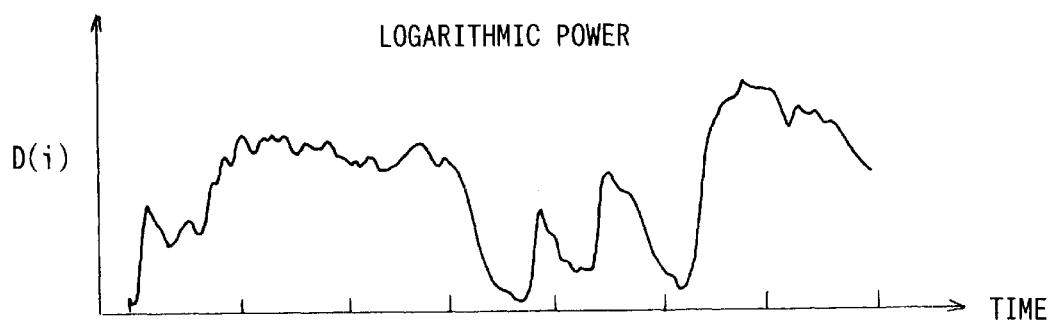
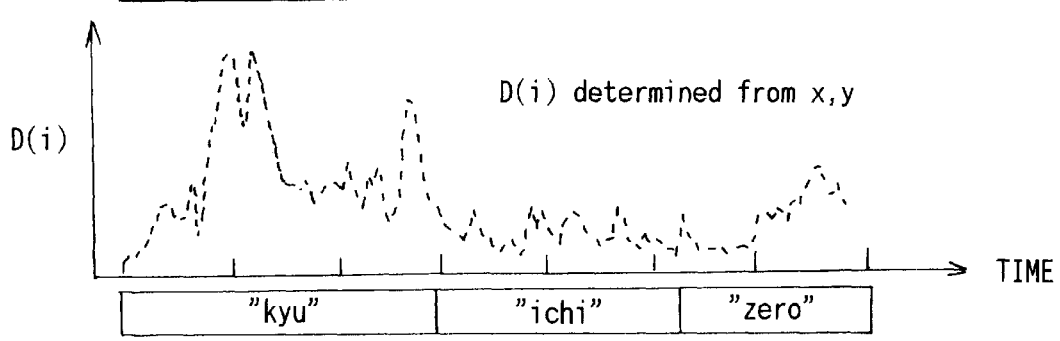
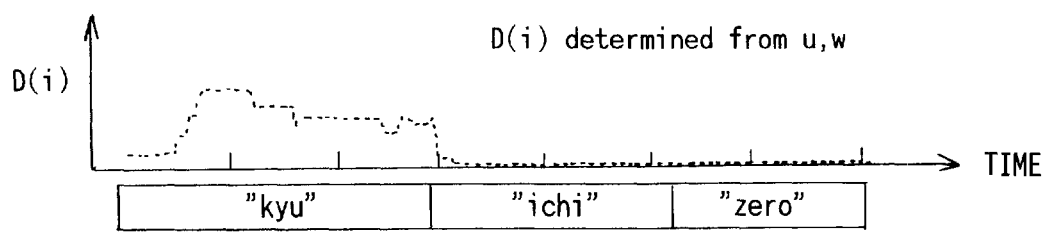

METHOD AND APPARATUS FOR SPEAKER RECOGNITION

BACKGROUND OF THE INVENTION

The present invention relates to method and apparatus for speaker recognition and, more particularly, to a method of and an apparatus for recognizing or identifying a speaker.

Heretofore, speaker recognition independently of speech content is usually performed on the basis of the distance between a feature parameter of an input speech and a registered parameter of a speech, which has been produced by the speaker to be recognized.

Denoting the input speech parameter series by $\vec{x}_i$, the registered speech parameter series by $\vec{y}_j$ (I and J are sample number) and the distance between these parameter series by $D_{old}$, $D_{old}$ is obtained from the following Formulas. Symbol "$\|\cdot\|$" represents Euclid distance.

$$D_{old} = \sum_{i=1}^{I} D(i)$$

$$D(i) = \min\|\vec{x}_i - \vec{y}_j\|^2$$

In order to reduce the computational effort and the memory capacity, it is also in practice that, instead of directly storing the feature vector series of speeches, a feature vector series $\vec{c}_k$ obtained by vector quantization is stored as a reference pattern.

$$D'_{old} = \sum_{i=1}^{I} D'(i)$$

$$D'(i) = \min\|\vec{x}_i - \vec{c}_k\|^2$$

In the above prior art techniques, for accurately determining the distance, speeches contained in an input speech should all be preliminarily stored and relatively long-time speech is used for registering the speaker to be recognized. From the standpoint of the user's burden, speech necessary for the registration is preferably as little as possible. Reducing the necessary speech, however, results in an increase of non-registered phonemes contained in the input speech, thus reducing the accuracy of collation or matching.

As a means for solving this problem, a method disclosed in Japanese Patent Application No. 2-76296 (hereinafter referred to as Literature 1) is utilized. In this method, sizes of overlap parts of an input speech and a registered speech and also inter-overlap-part distances are utilized to determine the similarity measure.

FIG. 5 shows the system disclosed in Literature 1. As shown, the system comprises overlap size calculating part, which determines, as the size of overlap part, the number of input speech samples contained in an overlap parts of the distributions of an input speech and a reference speech, and an overlap part inter-element distance calculating part. The distance between the input and reference speech patterns is determined from the results of calculations in these parts according to the following Formula.

$$D_{new} = \frac{\sum_{i=1}^{I} d_i + d_{out}(u_{max} - u)}{u_{max}}$$

$$d_i = \begin{cases} \min\|\vec{x}_i - \vec{c}_k\|^2, & \text{for } A_i \neq 0 \quad (1) \\ 0 & \text{otherwise} \quad (2) \end{cases}$$

$$A_i = \{k \mid 1 \leq k \leq K \text{ and } \|\vec{x}_i - \vec{c}_k\| \leq l_w\}$$

U: number of samples corresponding to (1)

$U_{max}$: maximum number of samples corresponding to (1) for all reference patterns $d_{out}$: fixed distance for samples corresponding to (2)

$l_k$: coverage of k-th element $\vec{c}_k$ of reference pattern $\|\cdot\|$Euclid distance More specifically, a coverage $l_k$ of each reference speech pattern element is previously determined, and when the distance $d_i$ between the nearest element in the reference speech pattern and the input speech pattern exceeds its coverage, a separately determined penalty distance $d_{out}$ is added to all input speech pattern feature vectors, and the result is normalized by the overlap part size $U_{max}$.

In this method, however, the overlap part size $U_{max}$ is determined from all reference patterns. Therefore, where registration is performed by using speeches of different contents with different speakers, the input speech content of a speaker may be close to the registered speech of a different speaker. In such a case, the $U_{max}$ may be unfairly significantly evaluated, giving rise to performance deterioration. For this reason, substantially the same number of different kinds of phonemes should be contained in the contents of the registered speeches.

In addition, according to Literature 1, the coverage of each reference pattern element is determined on the basis of the distance from the center of a cluster (i.e., element $\vec{c}_k$) to the farthest distance feature parameter contained in that cluster. However, even with the same phoneme, the feature parameter varies with different speakers, and this means that it is difficult to obtain stable distribution overlap estimation.

SUMMARY OF THE INVENTION

The present invention, accordingly, has an object of providing a speaker recognition system capable of stable recognition irrespective of speakers and registration by using various speeches through an identity/non-identity check of contents of an input speech and a registered speech by speech recognition.

(1) According to a first aspect of the present invention, there is provided a method of recognizing a speaker of an input speech according to the distance between an input speech pattern, obtained by converting the input speech to a feature parameter series, and a reference pattern preliminarily registered as feature parameter series for each speaker, comprising steps of:

obtaining contents of the input and reference speech patterns by recognition;

determining an identical section, in which the contents of the input and reference speech patterns are identical;

determining the distance between the input and reference speech patterns in the calculated identical content section;

normalizing the input speech pattern by one of copying the input speech pattern and weighting the distance determined between the input and reference speech patterns if the distance between the input and reference speech patterns is greater than a predetermined value, in which the distance between the input and reference speech patterns is decreased by normalization to reduce the adverse effects of noise; and recognizing the speaker of the input speech on the basis of the determined distance.

(2) According to a second aspect of the present invention, there is provided a method of recognizing a speaker of an input speech independently of the content thereof by converting the input speech to an input speech pattern as a feature parameter series and determining the difference of the input speech pattern from a reference speech pattern registered for each speaker, the method comprising the steps of:

obtaining the contents of the input and reference patterns by speech recognition, and determining the distance by determining identical content sections of the input and reference speech patterns from the obtained pattern content data.

(3) According to a third aspect of the present invention, there is provided a method of recognizing a speaker of an input speech comprising steps of:

determining an identical section of the input speech and a reference speech;

copying the input speech and reference speech in an unspecified speaker's acoustical model;

determining a distance between the copied input speech and a reference speech at least for the identical section;

normalizing the input speech pattern by one of copying the input speech pattern and weighting the distance determined between the input and reference speech patterns if the distance between the input and reference speech patterns is greater than a predetermined value, in which the distance between the input and reference speech patterns is decreased by normalization to reduce the adverse effects of noise; and recognizing the speaker of the input speech.

(4) According to a fourth aspect of the present invention, there is provided a method of recognizing a speaker of an input speech comprising steps of:

copying the input speech and reference speech in an unspecified speaker's acoustical model;

determining an identical section of the copied input speech and the reference speech;

determining a distance between the copied input speech and reference speech at least for the identical section;

normalizing the input speech pattern by one of copying the input speech pattern and weighting the distance determined between the input and reference speech patterns if the distance between the input and reference speech patterns is greater than a predetermined value, in which the distance between the input and reference speech patterns is decreased by normalization to reduce the adverse effects of noise; and recognizing the speaker of the input speech.

(5) According to a fifth aspect of the present invention, there is provided an apparatus for recognizing a speaker of an input speech according to the distance between an input speech pattern, obtained by converting the input speech to a feature parameter series, and a reference pattern preliminarily registered as feature parameter series for each speaker, comprising:

a first means for obtaining contents of the input and reference speech patterns by recognition;

a second means for determining an identical section, in which the contents of the input and reference speech patterns are identical;

a third means for determining the distance between the input and reference speech patterns in the calculated identical content section; and a fourth means for normalizing the input speech pattern by one of copying the input speech pattern and weighting the distance determined between the input and reference speech patterns if the distance between the input and reference speech patterns is greater than a predetermined value, in which the distance between the input and reference speech patterns is decreased by normalization to reduce the adverse effects of noise; and a fifth means for recognizing the speaker of the input speech on the basis of the determined distance.

(6) According to a sixth aspect of the present invention, there is provided an apparatus for recognizing a speaker of an input speech comprising:

a first means for determining an identical section of the input speech and a reference speech;

a second means for copying the input speech and reference speech in an unspecified speaker's acoustical model;

a third means for determining a distance between the copied input speech and reference speech at least for the identical section;

a fourth means for normalizing the input speech pattern by one of copying the input speech pattern and weighting the distance determined between the input and reference speech patterns if the distance between the input and reference speech patterns is greater than a predetermined value, in which the distance between the input and reference speech patterns is decreased by normalization to reduce the adverse effects of noise; and a fifth means for recognizing the speaker of the input speech.

(7) According to a seventh aspect of the present invention, there is provided an apparatus for recognizing a speaker of an input speech comprising:

a first means for copying the input speech and reference speech in an unspecified speaker's acoustical model;

a second means for determining an identical section of the copied input speech and reference speech at least for the identical section;

a third means for determining a distance between the copied input speech and reference speech at least for the identical section;

a fourth means for normalizing the input speech pattern by one of copying the input speech pattern and weighting the distance determined between the input and reference speech patterns if the distance between the input and reference speech patterns is greater than a predetermined value, in which the distance between the input and reference speech patterns is decreased by normalization to reduce the adverse effects of noise; and a fifth means for recognizing the speaker of the input speech.

Other objects and features will be clarified from the following description with reference to attached drawings.

BRIEF DESCRIPTION OF THE DRAWINGS

FIG. 4 shows the relationship among logarithmic power for explaining the present invention.

PREFERRED EMBODIMENTS OF THE INVENTION

Figure 1:
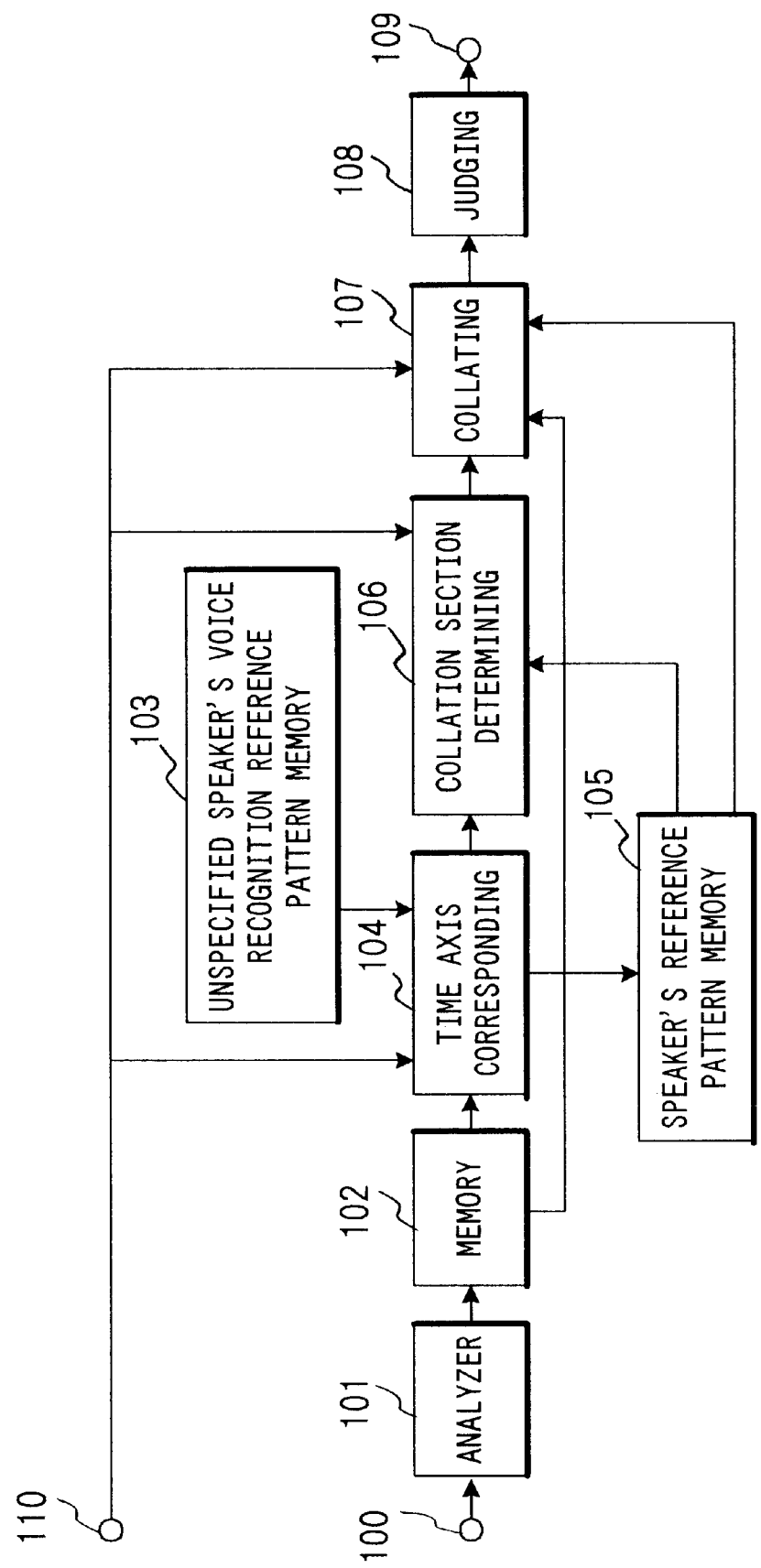
FIG. 1 is a block diagram showing a first embodiment of the speaker recognition system according to the present invention.

Preferred embodiments of the present invention will now be described with reference to the drawings.

In the present invention, the contents of an input speech pattern and a reference speech pattern are estimated by using speech recognition to realize a highly accurate estimation of identical speech content sections independent of the speech content and the speaker, thus realizing a speaker recognition system that is highly accurate and independent of any speech content.

A technique for determining the content and phoneme segments of a certain speech, which is called segmentation, finds extensive applications in the field of speech recognition. This technique is dealt with in Fujihara et al, "A Scheme of Hybrid Phoneme Segmentation System Based on HMM Spectrogram Reading", the Journal of the Acoustical Society of Japan, pp. 85–86, March 1991 (hereinafter referred to as Literature 2).

According to Literature 2, each phoneme as the subject of segmentation is expressed by Hidden Markov Model (HMM) expression, a word model is produced by joining together such phoneme models according to the speech content of each word as the subject of segmentation, and inter-phoneme boundaries are determined (i.e., Viterbi decoded) according to the result of production of time axis correspondence of registered speech to input speech. This system may be applied to speaker collation independent of speech content in such a way as to make time axis correspondence for models, which permit generation of all Japanese phoneme series, because the content of an input speech is unknown. In this case, by using garbage models obtained from an unspecified speaker's speech segmentation of speech of any speaker may be obtained without registering any speech of the input speech speaker.

Once the content and phoneme segments or identical content sections of registered speech and input speech have been determined in the above way, the distance between the two speech patterns can be determined by using phoneme segments, which are contained in both the registered speech and input speech. Denoting a feature parameter series of the input speech by $x_i$, a feature parameter series of the registered speech by $y_j$ (I and J are the sample number), the identical content phoneme number by p ($1 \leq p \leq P$) and the start and the end of the input and registered speeches containing p-th phoneme by $i_s(p)$, $i_e(p)$ and $j_s(p)$, and $j_e(p)$ ($1 \leq p \leq P$), respectively, the distance D can be obtained as:

$$D = \frac{1}{N} \sum_{p=1}^{P} \sum_{i=i_s(p)}^{i=e(p)} D(i, p)$$

$$D(i,p) = \min \| \vec{x}_i - \vec{y}_j \|^2, j_s(p) \leq j \leq j_e(p)$$

$$N = \sum_{p=1}^{P} \sum_{i=i_s(p)}^{i=e(p)} 1$$

In the above way, it is possible by using only identical content phonemes to determine the distance and realize a highly accurate recognition system.

Instead of explicitly determining the identical content sections, it is possible to once copy the registered and input speeches in an unspecified speaker's acoustical model according to the result of the time axis correspondence production and determine the distance between the two speeches before the copying according to the distance between the copied speeches. By producing the copy in the unspecified speaker s acoustical model, it is possible to exclude adverse effects of noise attributable to the speaker and ambient noise and thus improve the accuracy of the distance determination.

Assuming that correspondence s=g(i) between the input speech sample i and feature parameter $\vec{r}_s$ of unspecified speaker s acoustical model has been obtained according to the time axis correspondence between the input speech and the unspecified speaker s acoustical model, copy $\vec{u}_i$ of input speech $\vec{x}_i$ in the unspecified speaker's acoustical model is determined, according to g(i), $$\vec{u}_i = \vec{r}_{g(i)}$$

Likewise, copy $\vec{w}_j$ of registered speech $\vec{y}_j$ in the unspecified speaker's acoustical model is expressed, by using correspondence t=h(j) between the registered speech sample j and feature parameter $\vec{r}_t$ of the unspecified speaker's acoustical model, as:

$$\vec{w}_j = \vec{r}_{h(j)}$$

The feature parameters $\vec{x}_i$ and $\vec{y}_j$ contain vocal sound data, speaker data, ambient noise data and various other data. Therefore, when verifying the identity of contents, difference of vocal sound data other than the pertinent data has adverse effects on the distance, resulting in accuracy reduction. The copies $\vec{u}_j$ and $\vec{w}_j$ obtained in this way contain unspecified speaker's acoustical data alone, and thus they can facilitate the content identity verification.

FIG. 4 shows the relationship among logarithmic power in a case where a three-digit figure "ichi-ni-zero" in Japanese meaning (120) is the content of the registered speech of a certain speaker and "kyu-ichi-zero" in Japanse meaning (910) is the content of the input speech, distance D(i) determined directly from $\vec{x}_i$ and $\vec{y}_i$ and distance D(i) determined from $\vec{u}_i$ and $\vec{w}_j$. As is seen from the Figure, the difference determined directly from $\vec{x}_i$ and $\vec{y}_i$ extremely fluctuates, so that it is difficult to determine the identity of spoken contents by comparing the distance with a threshold value. In contrast, the difference determined from $\vec{u}_i$ and $\vec{w}_j$ is stable, and thus facilitates the detection identical content part of "ichi-zero" in Japanese meaning (10).

Thus, it is possible to determine a distance reflecting the degree of identity of vocal sounds, by determining a weight function of the distance determined from $\vec{u}_i$ and $\vec{w}_j$ according to this distance. For example, the degree $D_{xy}$ of difference between $\vec{x}_i$ and $\vec{y}_j$ may be defined as:

$$D_{xy} = \frac{1}{N} \sum_{i=1}^{I} W(D_{uw}(i)) \cdot D_{xy}(i)$$

$$D_{xy}(i) = \min \|\vec{x}_i - \vec{y}_j\|^2$$

$$D_{uw}(i) = \min \|\vec{u}_i - \vec{w}_j\|^2$$

$$W(D) = 1.0/\exp(D)$$

$$N = \sum_{i=1}^{I} W(D_{uw}(i))$$

Alternatively, the distance may be determined by using a predetermined threshold value θ as:

$$D_{xy} = \frac{1}{N} \sum_{i=1}^{I} D(i), \; D(i) < \infty$$

$$D(i) = \min(W(i,j) \cdot \|\vec{x}_i - \vec{y}_j\|^2)$$

$$W(i,j) = 1, D_{uw}(i) < \theta$$

$$\infty, \theta \leq D_{uw}(i,j)(i,j)$$

$$D_{uw}(i,j) = \|\vec{u}_i - \vec{w}_j\|^2$$

$$N = \sum_{i=1}^{I} i, \; D(i) < \infty$$

In the present invention, the above definitions of $D_{xy}$ and W are by no means limitative, and various other definitions are possible.

As shown above, according to the present invention identical content sections of registered and input speeches are determined after acoustically copying speech containing variation factors in an acoustical model which contains vocal sound character differences alone. Thus, it is possible to obtain stable detection of sections irrespective of the speaker, word and environment, so that it is possible to realize a highly accurate speaker recognition system.

In addition, since the vectors obtained as a result of the copying are known acoustical feature vectors, it is possible to reduce the computational effort in the collation by preliminarily calculating $D_{uw}(i)$ or $D_{uw}(i, j)$.

FIG. 1 is a block diagram showing a first embodiment of the speaker recognition system according to the present invention.

Data representing registration or collation to be performed and also a speaker number representing a speaker are inputted to a terminal 110. A case will first be considered, in which the data supplied to the terminal 110 represents registration.

Speech inputted to a terminal 100 is converted in an analyzer part 101 to a feature vector series, which is tentatively stored in a memory unit 102. As the feature vector may be used cepstrum, LPC coefficient and changes in these parameters with time, obtainable by FFT analysis, linear prediction analysis and the like, as mentioned in, for instance, Furui, "Digital Speech Processing", Publishing Association, Tokai University (hereinafter referred to as Literature 3).

A time axis correspondence producing part 104 reads out an unspecified speaker's reference speech pattern for speech recognition from an unspecified speaker's speech recognition reference pattern memory part 103, and produces time axis correspondence of the read-out speech pattern to the input vector series stored in the memory part 102. The result of the time axis correspondence production with respect to the input vector series, is stored and registered, as data corresponding to the speaker number inputted to the terminal 110, in a reference speech pattern memory part 105.

A case will now be described, in which the data inputted to the terminal 110 represents collation. Like the above case, speech inputted to the terminal 100 is converted in the analyzer part 101 to a feature vector series, which is tentatively stored in the memory part 102.

Also, the time axis correspondence producing part 104 reads out an unspecified speaker's reference speech pattern for speech recognition from an unspecified speaker's speech recognition reference speech pattern memory part 103, and produces time axis correspondence of the read-out speech pattern to the input vector series stored in the memory part 102. In this case, the result of the time axis correspondence production is supplied to a collation section determining part 106.

The collation section determining part 106 receives the time axis correspondence production result with resect to the input speech, received from the time axis correspondence producing part 104, and the time axis correspondence production result with respect to the speaker number inputted to the terminal 110, received from the reference speech pattern memory part 105, and determines the collation section.

A collating part 107 calculates the distance between the feature vector series, corresponding to the speaker number inputted to the terminal 110, and the feature vector series of the input speech read out from the memory part 102, by using the collation section read out from the collation section determining part 106.

When the distance calculated by the collating part 107 is less than a threshold value, a judging part 108 judges the input speech to be of the identical speaker, while otherwise determining the input speech to be of a different speaker, and supplies the result data to a terminal 109.

Figure 2:
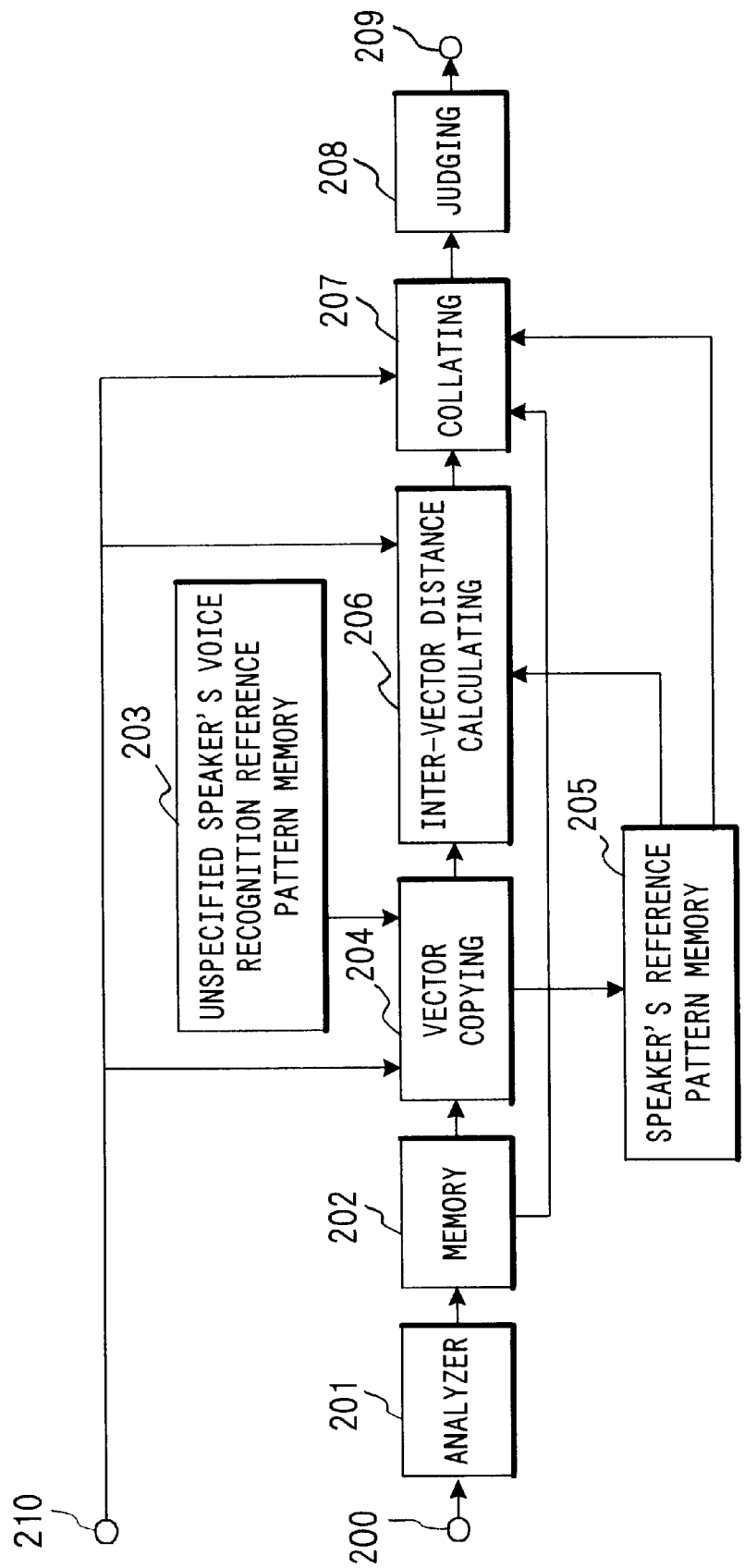
FIG. 2 is a block diagram showing a second embodiment of the speaker recognition system according to the present invention.

FIG. 2 is a block diagram showing a second embodiment for the speaker recognition system according to the present invention.

Data representing registration or collation to be performed and also a speaker number representing a speaker are inputted to a terminal 210.

A case will first be considered, in which the data input to the terminal 210 represents registration.

Speech inputted to a terminal 200, is converted in an analyzer part 201 to a feature vector series, which is tentatively stored in a memory unit 202. As the feature vector may be used cepstrum, LPC coefficient and change in these parameters with time, obtainable by FFT analysis, linear prediction analysis and the like, as mentioned in, for instance, Literature 3.

A vector copying part 204 reads out an unspecified speaker's reference speech pattern for speech recognition from an unspecified speaker's speech recognition reference speech pattern memory part 203, and produces time axis correspondence of the read-out speech pattern to the input vector series stored in the memory part 202. Based on this result, the vector copying part 204 copies the input vector series in an unspecified speaker's acoustical model to produce a copied vector series. The input vector series and the copied vector series are then stored and registered, as data corresponding to the speaker number inputted to the terminal 210, to a reference pattern memory part 205.

A case will now be described, in which the data inputted to the terminal 210 represents collation.

Like the above case, speech inputted to the terminal 200 is converted in the analyzer part 201 to a feature vector series, which is tentatively stored in the memory part 202.

The vector copying part 204 reads out the unspecified speaker's reference pattern for speech recognition from the unspecified speaker's speech recognition reference pattern memory 203, and produces time axis correspondence of the read-out speech pattern to the input vector series stored in the memory 202. Based on this result, the vector copying part 204 copies the input vector series in the unspecified speaker's acoustical model to produce the copied vector series, and supplies same an inter-vector distance calculating part 206. If the distance between the input and reference speech patterns is greater than a predetermined value, the vector copying part 204 normalizes the input speech pattern by copying the input speech pattern such that the distance between the input and reference speech patterns is decreased by normalization, thereby reducing the adverse effects of noise.

The inter-vector distance calculating part 206 calculates the inter-vector distance concerning the copied vector series supplied from the vector copying part 204 and a copied vector series corresponding to the speaker number inputted to the terminal 210. To reduce the adverse effects of noise, the inter-vector distance calculating part 206 may normalize the input speech pattern by weighting the distance determined between the input and reference speech patterns.

A collating part 207 calculates, from the inter-vector distance for the copied vector series, received from the inter-vector distance calculator 206, a distance between the feature vector series corresponding to the speaker number inputted to the input terminal 210, read out from the reference pattern memory part 205, and the feature vector series of the input speech, read out from the memory part 202.

When the distance calculated by the collating part 207 is less than a threshold, a judging part 208 judges the input speech to be of the identical speaker, while otherwise judging the input speech to be of a different speaker, and supplies result data to a terminal 209.

Figure 3:
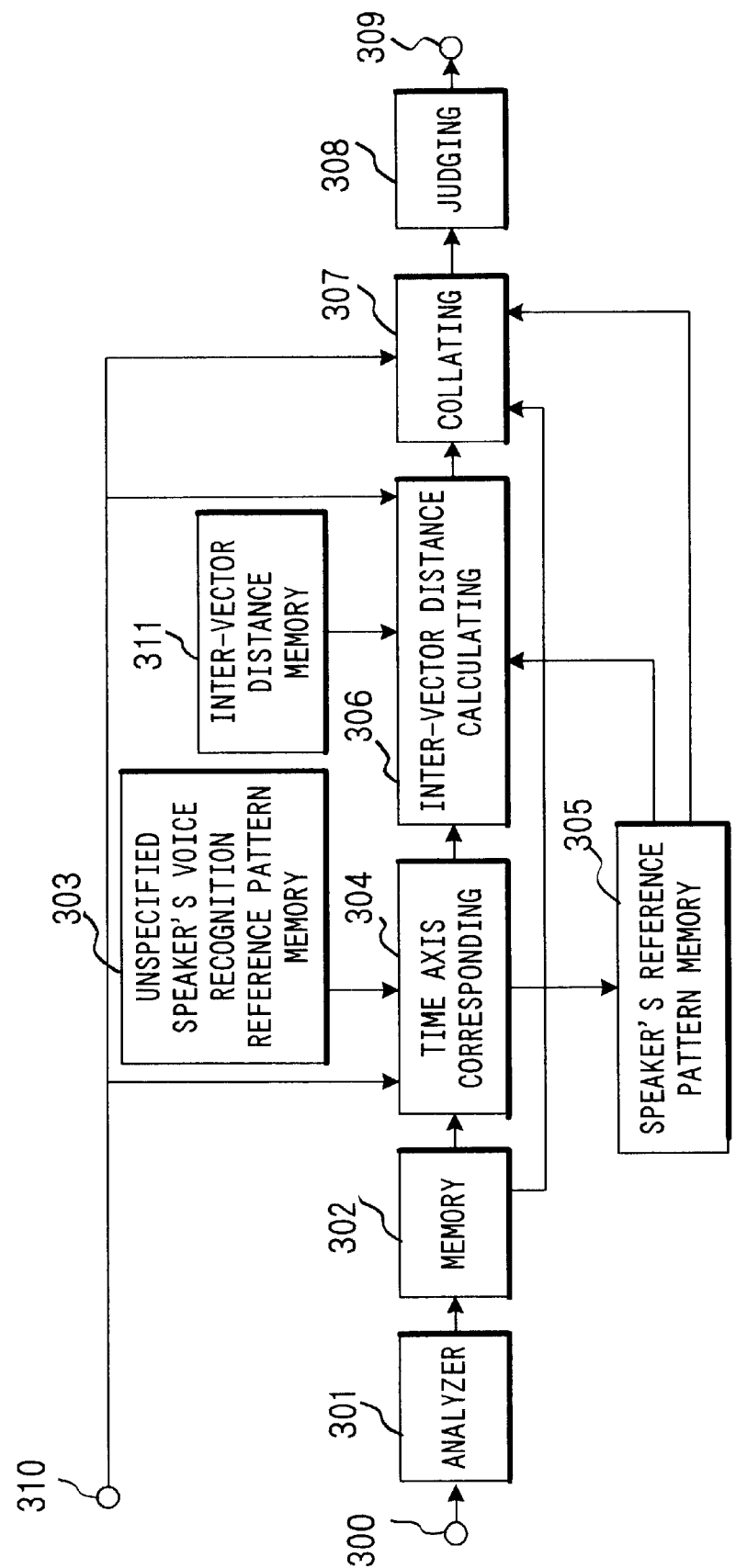
FIG. 3 is a block diagram showing a third embodiment of the speaker recognition system according to the present invention.
Figure 5:
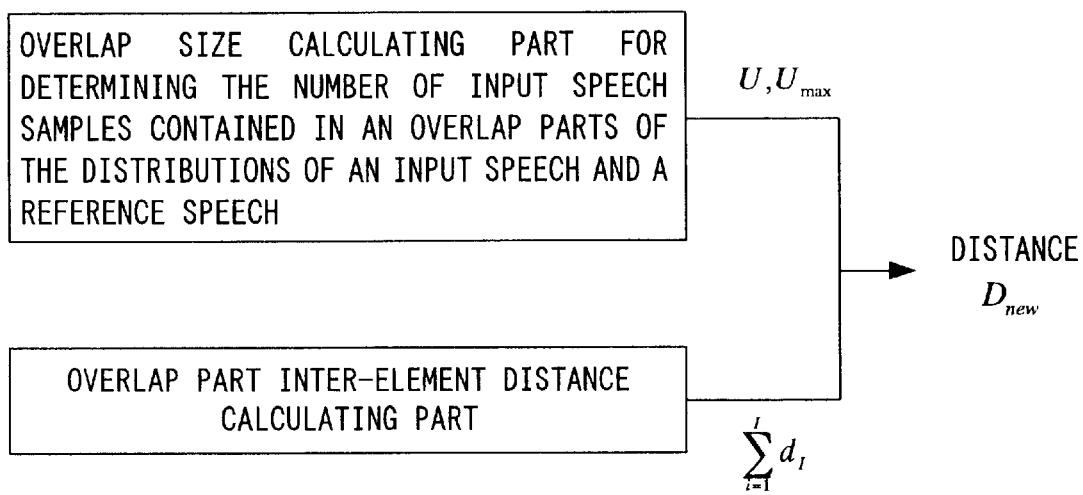
FIG. 5 shows a block diagram of the prior art speaker recognition system.

FIG. 3 is a block diagram showing Embodiment 3 of the speaker recognition system according to the present invention.

Data representing registration or collation to be performed and also a speaker number representing a speaker are inputted to terminal 310.

A case will now be described, in which the data input to the terminal 310 represents registration.

Speech data supplied to a terminal 300, is converted in an analyzer part 301 to a feature vector series, which is tentatively stored in a memory unit 302. As the feature vector may be used cepstrum, LPC coefficient and changes in these parameters with time, obtainable by FFT analysis, linear prediction analysis and the like, as mentioned in, for instance, Literature 3.

A time axis correspondence producing part 304 reads out an unspecified speaker's reference speech pattern for speech recognition from an unspecified speaker's speech recognition reference speech pattern memory part 303, and produces time axis correspondence of the read-out speech pattern and the input speech series stored in the memory part 302. The result of the time axis correspondence production with respect to the input vector series, is stored and registered, as data corresponding to the speaker number inputted to the terminal 310, in a reference speech pattern memory part 305.

A case will now be described, in which the data inputted to the terminal 310 represents collation.

Like the above case, speech inputted to the terminal 300 is converted in the analyzer part 301 to a feature vector series, which is tentatively stored in the memory part 302.

The time axis correspondence producing part 304 reads out the unspecified speaker's reference pattern for speech recognition from the unspecified speaker's speech recognition memory part 303, and produces time axis correspondence of the read-out speech pattern to the input vector series stored in memory part 302. In this case, the time axis correspondence producing part 304 supplies the result of the time axis correspondence production to an inter-vector distance determining part 306.

In an inter-vector distance memory part 311 is stored inter-feature-vector distance data stored in the unspecified speaker's speech recognition reference pattern memory 303.

The inter-feature-vector distance memory part 306 receives the time axis correspondence data about the input speech from the time axis correspondence producing part 304 and the time axis correspondence data, corresponding to the speaker number inputted to the terminal 310, from the time axis correspondence producing part 304, and reads out the inter-vector distance data of the copied vector series from the inter-vector distance memory part 311.

A collating part 307 calculates a distance between the feature vector series corresponding to the speaker number inputted from the terminal 310, read out from the reference pattern memory part 305, and the feature vector series of the input speech, reads out from the memory part 302, according to the inter-vector distance data out the copied vector series, received from the inter-vector distance determining part 306.

When the calculated distance obtained in the collating part 307 is less than a threshold value, a judging part 308 judges the input speech to be of the identical speaker, while otherwise judging the input speech to be of a different speaker, and supplies the result of judgment to a terminal 309.

Changes in construction will occur to those skilled in the art and various apparently different modifications and embodiments may be performed without departing from the scope of the present invention. The matter set forth in the foregoing description and accompanying drawings is offered by way of illustration only. It is therefore intended that the foregoing description be regarded as illustrative rather than limiting.

What is claimed is:

1. A method of recognizing a speaker of an input speech according to the distance between an input speech pattern, obtained by converting the input speech to a feature parameter series, and a reference pattern preliminarily registered as feature parameter series for each speaker, comprising steps of:

obtaining contents of the input and reference speech patterns by recognition;

determining an identical section, in which the contents of the input and reference speech patterns are identical;

determining the distance between the input and reference speech patterns in said identical section;

normalizing the input speech pattern by one of copying said input speech pattern and weighting said distance determined between the input and reference speech patterns if the distance between the input and reference speech patterns is greater than a predetermined value, in which the distance between the input and reference speech patterns is decreased by normalization to reduce the adverse effects of noise; and recognizing the speaker of the input speech on the basis of the determined distance.

2. The speaker recognition method according to claim 1, wherein the speaker recognition is performed on the basis of the distance between the input and reference speech patterns only for identical data of phonemes of the input and reference speech patterns obtained through the time axis correspondence between the input and reference speech patterns.

3. The speaker recognition method according to claim 2, wherein the time axis correspondence is obtained on the basis of a garbage model provided by an unspecified speaker.

4. A method for recognizing a speaker of an input speech independently of the content thereof by converting the input speech to an input speech pattern as a feature parameter series and determining the difference of the input speech pattern from a reference speech pattern registered for each speaker, the method comprising the steps of:

obtaining the contents of the input and reference patterns, determining the distance between the input and reference speech patterns by determining identical content sections of the input and reference speech patterns from the obtained pattern content data, normalizing the input speech pattern by one of copying said input speech pattern and weighting said distance determined between the input and reference speech patterns if the distance between the input and reference speech patterns is greater than a predetermined value, in which the distance between the input and reference speech patterns is decreased by normalization to reduce the adverse effects of noise; and recognizing the speaker of the input speech when the distance between the input and a specific speech pattern is less than a predetermined value.

5. A method of recognizing a speaker of an input speech comprising steps of:

determining an identical section of the input speech and a reference speech;

copying the input speech and reference speech in an unspecified speaker's acoustical model;

determining a distance between the copied input speech and a reference speech at least for the identical section;

normalizing the input speech pattern by one of copying said input speech pattern and weighting said distance determined between the input and reference speech patterns if the distance between the input and reference speech patterns is greater than a predetermined value, in which the distance between the input and reference speech patterns is decreased by normalization to reduce the adverse effects of noise; and recognizing the speaker of the input speech.

6. The speaker recognition method according to claim 5, wherein the speaker recognition is performed on the basis of the distance between the input and reference speech patterns only for identical data of phonemes of the input and reference speech patterns obtained through the time axis correspondence between the input and reference speech patterns.

7. A method of recognizing a speaker of an input speech comprising steps of:

copying the input speech and reference speech in an unspecified speaker's acoustical model;

determining an identical section of the copied input speech and the reference speech;

determining a distance between the copied input speech and reference speech at least for the identical section;

normalizing the input speech pattern by one of copying said input speech pattern and weighting said distance determined between the input and reference speech patterns if the distance between the input and reference speech patterns is greater than a predetermined value, in which the distance between the input and reference speech patterns is decreased by normalization to reduce the adverse effects of noise; and recognizing the speaker of the input speech.

8. The speaker recognition method according to claim 7, wherein the speaker recognition is performed on the basis of the distance between the input and reference speech patterns only for identical data of phonemes of the input and reference speech patterns obtained through the time axis correspondence between the input and reference speech patterns.

9. An apparatus for recognizing a speaker of an input speech according to the distance between an input speech pattern, obtained by converting the input speech to a feature parameter series, and a reference pattern preliminarily registered as feature parameter series for each speaker, comprising:

a first means for obtaining contents of the input and reference speech patterns by recognition;

a second means for determining an identical section, in which the contents of the input and reference speech patterns are identical;

a third means for determining the distance between the input and reference speech patterns in the calculated identical content section;

a fourth means for normalizing the input speech pattern by one of copying said input speech pattern and weighting said distance determined between the input and reference speech patterns if the distance between the input and reference speech patterns is greater than a predetermined value, in which the distance between the input and reference speech patterns is decreased by normalization to reduce the adverse effects of noise; and a fifth means for recognizing the speaker of the input speech on the basis of the determined distance.

10. An apparatus for recognizing a speaker of an input speech comprising;

a first means for determining an identical section of the input speech and a reference speech;

a second means for copying the input speech and reference speech in an unspecified speaker's acoustical model;

a third means for determining a distance between the copied input speech and reference speech at least for the identical section;

a fourth means for normalizing the input speech pattern by one of copying said input speech pattern and weighting said distance determined between the input and reference speech patterns if the distance between the input and reference speech patterns is greater than a predetermined value, in which the distance between the input and reference speech patterns is decreased by normalization to reduce the adverse effects of noise; and a fifth means for recognizing the speaker of the input speech.

11. An apparatus for recognizing a speaker of an input speech comprising:

a first means for copying the input speech and reference speech in an unspecified speaker's acoustical model;

a second means for determining an identical section of the copied input speech and the reference speech;

a third means for determining a distance between the copied input speech and reference speech at least for the identical section;

a fourth means for normalizing the input speech pattern by one of copying said input speech pattern and weighting said distance determined between the input and reference speech patterns if the distance between the input and reference speech patterns is greater than a predetermined value, in which the distance between the input and reference speech patterns is decreased by normalization to reduce the adverse effects of noise; and a fifth means for recognizing the speaker of the input speech.

* * * * *